United States Patent
Zhang et al.

(10) Patent No.: US 11,211,812 B2
(45) Date of Patent: Dec. 28, 2021

(54) CONTROLLER AND BATTERY MANAGEMENT METHODS

(71) Applicant: O2Micro, Inc., Santa Clara, CA (US)

(72) Inventors: Yingguo Zhang, Wuhan (CN); Guoyan Qiao, Wuhan (CN); Fu-Jen Hsieh, Taipei (TW); Chia-Ming Chang, Taipei (TW); Chih-Chung Chou, Taipei (TW); Hua-Yi Wang, Taipei (TW)

(73) Assignee: O2Micro Inc., Santa Clara, CA (US)

( * ) Notice: Subject to any disclaimer, the term of this patent is extended or adjusted under 35 U.S.C. 154(b) by 165 days.

(21) Appl. No.: 16/799,648

(22) Filed: Feb. 24, 2020

(65) Prior Publication Data

US 2020/0350777 A1 Nov. 5, 2020

(30) Foreign Application Priority Data

Apr. 30, 2019 (CN) .......................... 201910359481.8

(51) Int. Cl.
*H02J 7/00* (2006.01)

(52) U.S. Cl.
CPC .......... *H02J 7/0071* (2020.01); *H02J 7/0013* (2013.01); *H02J 7/0036* (2013.01); *H02J 7/0047* (2013.01)

(58) Field of Classification Search
CPC .................................................. H02J 7/0071
USPC ....................................................... 320/134
See application file for complete search history.

(56) References Cited

U.S. PATENT DOCUMENTS

| | | | | |
|---|---|---|---|---|
| 6,614,232 B1* | 9/2003 | Mukai | ................... | H01M 10/42 324/426 |
| 7,579,842 B2* | 8/2009 | Hunter | ................... | H02J 7/0019 320/103 |
| 8,723,483 B2* | 5/2014 | Shimizu | ................... | B60L 3/00 320/122 |
| 2011/0080138 A1* | 4/2011 | Nakanishi | ............. | H02J 7/0016 320/116 |
| 2015/0123595 A1* | 5/2015 | Hussain | ................... | H02J 7/04 320/107 |

* cited by examiner

*Primary Examiner* — Yalkew Fantu

(57) ABSTRACT

A controller for managing a battery pack includes: a detection terminal, for transmitting an enable signal when values of battery parameters for the battery pack satisfy a sleep condition, where the enable signal enables the detection circuit to detect whether the battery pack is connected to a load and whether the battery pack is connected to the charger; and a receiving terminal, for receiving a detection result transmitted by the detection circuit. The detection result indicates whether the battery pack is connected to at least one of the load and charger. The controller controls the battery pack to enter a sleep mode of the sleep modes based on the detection result. The controller also includes a control terminal, for transmitting a control signal to control an on/off state of a charging switch and/or a discharging switch. The control signal is generated by the controller based on the detection result.

20 Claims, 5 Drawing Sheets

CONTROLLER AND BATTERY MANAGEMENT METHODS

This application claims priority to Chinese Patent Application No. 201910359481.8, titled "Controller and Battery Management Methods," filed on Apr. 30, 2019, with the National Intellectual Property Administration of the People's Republic of China (CNIPA).

BACKGROUND

As living standards have improved, mobile electronic devices have increasingly become a part of people's daily lives, including electronic devices such as robotic sweepers, vacuum cleaners, etc. Batteries are essential to the operation of these electronic devices. At present, the most common batteries are lithium-ion batteries. Generally, lithium-ion batteries can be charged and discharged 300 to 500 times, and their lifespan is about two to three years. However, abnormal conditions (e.g., over-temperature, over-voltage, and over-current) can occur in the process of using lithium-ion batteries, which may destroy their internal structure, thus reducing their lifespan. Therefore, a battery management system is used to manage lithium-ion batteries to reduce or avoid occurrences of abnormal conditions. However, the battery management system cannot manage its own power consumption, which consumes electric power stored in the lithium-ion batteries, thus shortening the standby time of the battery management system.

SUMMARY

Embodiments in accordance with the present invention provide controllers and battery management methods for managing a battery pack.

In embodiments, the controller includes: a detection terminal, coupled to a detection circuit, and operable for transmitting an enable signal when values of battery parameters for the battery pack satisfy a sleep condition, where the enable signal enables the detection circuit to detect whether the battery pack is connected to a load and whether the charger is connected to a charger. The sleep condition is for determining whether the battery pack is to enter a sleep state. The sleep state includes a number of sleep modes. The controller also includes a receiving terminal, coupled to the detection circuit, and operable for receiving a detection result transmitted by the detection circuit. The detection result indicates whether the battery pack is connected to at least one of the load and charger. The controller is operable for controlling the battery pack to enter a sleep mode of the sleep modes based on the detection result. The controller also includes a control terminal, operable for transmitting a control signal to control an on/off state of a charging switch and an on/off state of a discharging switch. The control signal is generated by the controller based on the detection result.

In embodiments, the battery management method includes: determining, using a controller, whether values of battery parameters for the battery pack satisfy a sleep condition for entering a sleep state, where the sleep state comprises a number of sleep modes; transmitting, using the controller, an enable signal to the detection circuit when the values of the battery parameters satisfy the sleep condition; detecting, using the detection circuit and in response to the enable signal whether the battery pack is connected to a load and whether the battery pack is connected to a charger; acquiring a detection result, where the detection result indicates whether the battery pack is connected to at least one of the load and charger; and controlling, using the controller, the battery pack to enter a sleep mode of the sleep modes based on the detection result.

BRIEF DESCRIPTION OF THE DRAWINGS

Features and advantages of embodiments of the present invention will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "acquiring," "transmitting," "detecting," "controlling," "generating," "determining," or the like, refer to actions and processes of a computing system or similar electronic computing device or processor or controller. A computing system or similar electronic computing device or processor or controller manipulates and transforms data represented as physical (electronic) quantities within its memories, registers or other such information storage, transmission or display devices.

Figure 1:
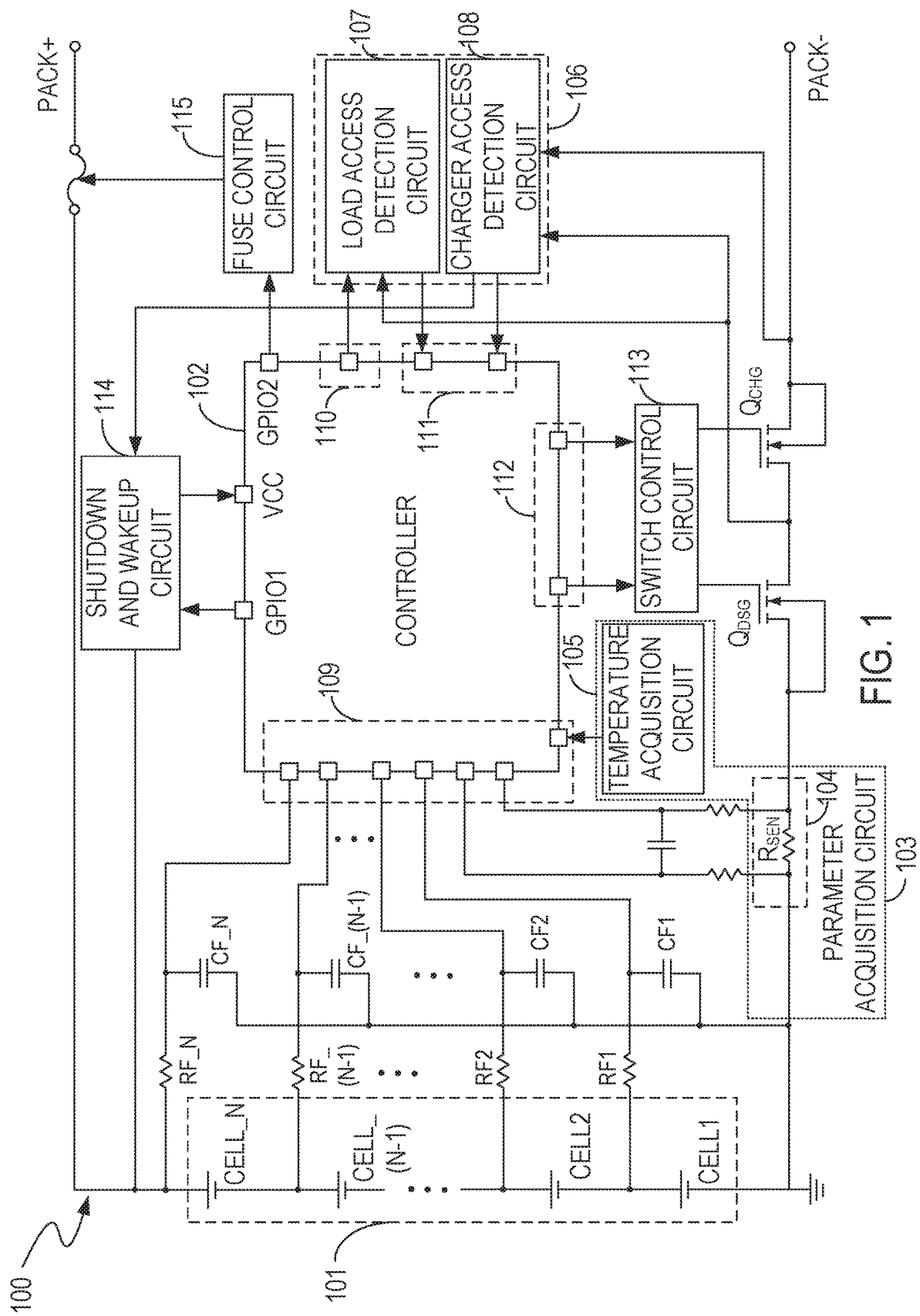
FIG. 1 shows a block diagram illustrating a battery pack, in accordance with embodiments of the present invention.

FIG. 1 shows a block diagram illustrating a battery pack 100, in accordance with embodiments of the present invention. The battery pack 100 includes a battery 101, a controller 102, and peripheral circuits coupled to the controller 102. The battery pack 100 also includes a positive terminal PACK+ and a negative terminal PACK−. In an embodiment, the positive terminal PACK+ represents the highest potential of the battery pack 100, and the negative terminal PACK− represents the lowest potential of the battery pack 100. Both a charging switch $Q_{CHG}$ and a discharging switch $Q_{DSG}$ are connected between the negative terminal PACK− and a negative electrode of the battery 101. When the charging switch $Q_{CHG}$ is turned on, the battery pack 100 can be charged. When the discharging switch $Q_{DSG}$ is turned on, the battery pack 100 can supply electric power to a load. A fuse is connected between the positive terminal PACK+ and a positive electrode of the battery 101. The fuse can be used to disconnect the battery pack 100 from a charger and/or load to protect the battery pack 100 in case of, for example, a permanent voltage-high failure.

The operating modes of the battery pack 100 include a sleep state, a power mode, a shutdown mode, and a suspend mode. The sleep state includes multiple sleep modes. The sleep modes include a load sleep mode, a charger sleep mode, and a non-load sleep mode. The power consumption of the battery pack 100 depends on the operating mode. In the sleep state, the controller 102 can control the battery pack 100 to enter one of the sleep modes according to whether the battery pack 100 is connected to the load and/or charger. That manner of operation not only allows the battery pack 100 to function normally, but also reduces the power consumption of the battery pack 100, thus prolonging the standby time of the battery 101.

The battery 101 includes one cell or multiple cells. In an embodiment, the battery 101 includes a cell CELL_1, a CELL_2, . . . , a CELL_N. The cells CELL_1, CELL_2, . . . , CELL_N are coupled in series. Each cell CELL_n (n=1, 2, . . . , N) can be a lithium-ion battery. In an embodiment, the operating voltage of the lithium-ion batteries is set between 2.5 V and 4.2 V. In other embodiments, the operating voltage of the lithium-ion battery can be set in other voltage ranges.

The peripheral circuits include one or more low-pass filters. In an embodiment, the peripheral circuits include multiple low-pass filters. Each of the low-pass filters is coupled to the corresponding cell CELL_n (n=1, 2, . . . , N). Each of the low-pass filters is operable for filtering out the high frequency components of a voltage provided by the cell CELL_n (n=1, 2, . . . , N), thus eliminating unwanted noise components. In this embodiment, the low-pass filter coupled to the cell CELL_n includes a monitoring resistor RF_n and a filter capacitor CF_n. The monitoring resistor RF_n is coupled in series with the filter capacitor CF_n (n=1, 2, . . . , N).

In embodiments, the peripheral circuits also include a parameter acquisition circuit 103. The parameter acquisition circuit 103 is coupled between the battery pack 100 and the controller 102. The parameter acquisition circuit 103 is operable for acquiring values of battery parameters for the battery pack 100. The battery parameters include, for example, the level (amount) of a battery current, and a battery temperature. In an embodiment, the parameter acquisition circuit 103 includes a current acquisition circuit 104 and a temperature acquisition circuit 105. The current acquisition circuit 104 is coupled between the battery 101 and the controller 102. The temperature acquisition circuit 105 is coupled to the controller 102.

Specifically, the current acquisition circuit 104 senses a battery current $I_{BAT}$ flowing through the battery pack 100 and generates a sensing voltage $V_{SEN}$ indicating the level of the battery current $I_{BAT}$. The battery current $I_{BAT}$ can be a charging current $I_{CHG}$ or a discharging current $I_{DSG}$. In the embodiment, if the battery current $I_{BAT}$ is a positive value and is greater than a charging current threshold $I_{C\_SET}$, then the battery current $I_{BAT}$ is a charging current $I_{CHG}$. If the battery current $I_{BAT}$ is a negative value and the absolute value of the battery current $I_{BAT}$ is greater than that of a discharging current threshold $I_{D\_SET}$, then the battery current $I_{BAT}$ is a discharging current $I_{DSG}$. In an embodiment, the current acquisition circuit 104 is a current sensor $R_{SEN}$.

The temperature acquisition circuit 105 senses a battery temperature $T_{BAT}$ of the battery pack 100 to generate a sensing voltage $V_{THM}$ indicating the battery temperature $T_{BAT}$. In the embodiment, the temperature acquisition circuit 105 is a thermal resistor.

In embodiments, the peripheral circuits also include a detection circuit 106. The detection circuit 106 is coupled to the controller 102. The detection circuit 106 is operable for receiving an enable signal transmitted by the controller 102, for detecting whether the battery pack 100 is connected to the load and/or charger in response to the enable signal, and for determining a detection result. In an embodiment, the detection circuit 106 includes a load access detection circuit 107 and a charger access detection circuit 108. The load access detection circuit 107 and the charger access detection circuit 108 are each coupled to the controller 102.

More specifically, the load access detection circuit 107 receives the enable signal transmitted by the controller 102, detects whether the battery pack 100 is connected to the load in response to the enable signal, and determines the detection result. If the detection result is that the battery pack 100 is connected to the load, then the load access detection circuit 107 transmits a low-level signal to the controller 102. If the detection result is that the battery pack 100 is not connected to the load, then the load access detection circuit 107 transmits a high-level signal to the controller 102. Therefore, it can be determined whether the battery pack 100 is connected to the load by the level of the signal (high or low) transmitted by the load access detection circuit 107. In an embodiment, the load access detection circuit 107 includes a resistor R. When the discharging switch $Q_{DSG}$ is turned off, in response to the enable signal transmitted by the controller 102, the load detection circuit 107 calculates that the ratio of the resistance of the resistor R to the sum of the resistance of the load and the resistance of the resistor R, and determines whether the product of the ratio and the voltage of the battery 101 is greater than a preset voltage (e.g., 0.7 V). If the product is greater than the preset voltage (e.g., 0.7 V), then the load is connected to the battery pack 100. Otherwise, the load is not connected to the battery pack 100.

The charger access detection circuit 108 detects whether the battery pack 100 is connected to the charger, and determines the detection result. If the detection result is that the battery pack 100 is connected to the charger, then the charger access detection circuit 108 transmits a low-level signal to the controller 102. If the detection result is that the battery pack 100 is not connected to the charger, then the charger access detection circuit 108 transmits a high-level signal to the controller 102. Therefore, it can be determined whether the battery pack 100 is connected to the charger by the level of the signal (high or low) transmitted by the charger access detection circuit 108. In an embodiment, when the charging switch $Q_{CHG}$ is turned off, the charger access detection circuit 108 determines whether the voltage difference between a voltage at the negative electrode of the battery 101 and a voltage at the negative terminal PACK− is greater than a preset voltage (e.g., 0.7 V). If the voltage difference is greater than the preset voltage (e.g., 0.7 V), then the charger is connected to the battery pack 100. Otherwise, the charger is not connected to the battery pack 100.

The controller 102 acquires (receives, or accesses) and analyzes values of battery parameters for the battery pack 100, transmits the enable signal when the values of the battery parameters satisfy a sleep condition that indicates whether the battery pack can or should enter a sleep state (one of the sleep modes), receives the detection result transmitted by the detection circuit 106, and generates a control signal according to the detection result. The control signal is used to turn on or turn off the charging switch $Q_{CHG}$ and/or the discharging switch $Q_{DSG}$. The controller 102 also controls the battery pack 100 to enter one of the sleep modes.

In an embodiment, the controller 102 includes an acquiring terminal 109, a detection terminal 110, a receiving terminal 111, and a control terminal 112. The acquiring terminal 109 is coupled to the battery 101. Both the detection terminal 110 and the receiving terminal 111 are coupled to the detection circuit 106. The control terminal 112 is coupled to the charging switch $Q_{CHG}$ and the discharging switch $Q_{DSG}$. In this embodiment, the controller 102 acquires the values of the battery parameters for the battery pack 100 through the acquiring terminal 109. When the values of the battery parameters satisfy the sleep condition, the controller 102 transmits the enable signal through the detection terminal 110. In response to the enable signal, the detection circuit 106 detects whether the battery pack 100 is connected to the load and/or charger, determines the detection result, and transmits the detection result to the controller 102. The controller 102 receives the detection result through the receiving terminal 111, generates the control signal, and transmits the control signal through the control terminal 112 to turn on or turn off the charging switch $Q_{CHG}$ and/or the discharging switch $Q_{DSG}$. Meanwhile, the controller 102 controls the battery pack 100 to enter one of the sleep modes according to the detection result, thus reducing power consumption by the battery pack 100. The relationship between the detection result and the sleep modes is described in more detail below. In an embodiment, the control signal includes a first-level voltage signal (e.g., a high-level signal) to turn on the charging switch $Q_{CHG}$ and/or the discharging switch $Q_{DSG}$, and also includes a second-level voltage signal (e.g., a low-level signal) to turn off the charging switch $Q_{CHG}$ and/or the discharging switch $Q_{DSG}$.

In embodiments, the peripheral circuits also include a switch control circuit 113. The switch control circuit 113 is coupled to the charging switch $Q_{CHG}$ and to the discharging switch $Q_{DSG}$. The switch control circuit 113 receives the control signal from the control terminal 112, converts the control signal to a high level or a low level, to turn on and/or turn off the charging switch $Q_{CHG}$ and/or the discharging switch $Q_{DSG}$. The charging switch $Q_{CHG}$ and/or the discharging switch $Q_{DSG}$ is turned on in response to the high level. The charging switch $Q_{CHG}$ and/or the discharging switch $Q_{DSG}$ is turned off in response to the low level.

In embodiments, the peripheral circuits also include a shutdown and wakeup circuit 114, and the controller 102 also includes a power terminal VCC and a terminal GPIO1. The shutdown and wakeup circuit 114 is coupled to the power terminal VCC and to the terminal GPIO1. The shutdown and wakeup circuit 114 transmits electric power supplied by the battery 101 to the controller 102 through the power terminal VCC, to enable the controller 102 to operate. The shutdown and wakeup circuit 114 receives an access signal indicating a charger is connected to the battery pack 100, and wakes up the controller 102 in response to the access signal. The shutdown and wakeup circuit 114 receives a shutdown signal through the terminal GPIO1 and stops the supply of electric power to the controller 102 in response to the shutdown signal.

In embodiments, the peripheral circuits also include a fuse control circuit 115, and the controller 102 also includes a terminal GPIO2. The fuse control circuit 115 is coupled to the terminal GPIO2. The fuse control circuit 115 receives a fuse signal through the terminal GPIO2 and operates (e.g., fuses or blows) the fuse to protect the battery pack 100 in response to the fuse signal.

Figure 2:
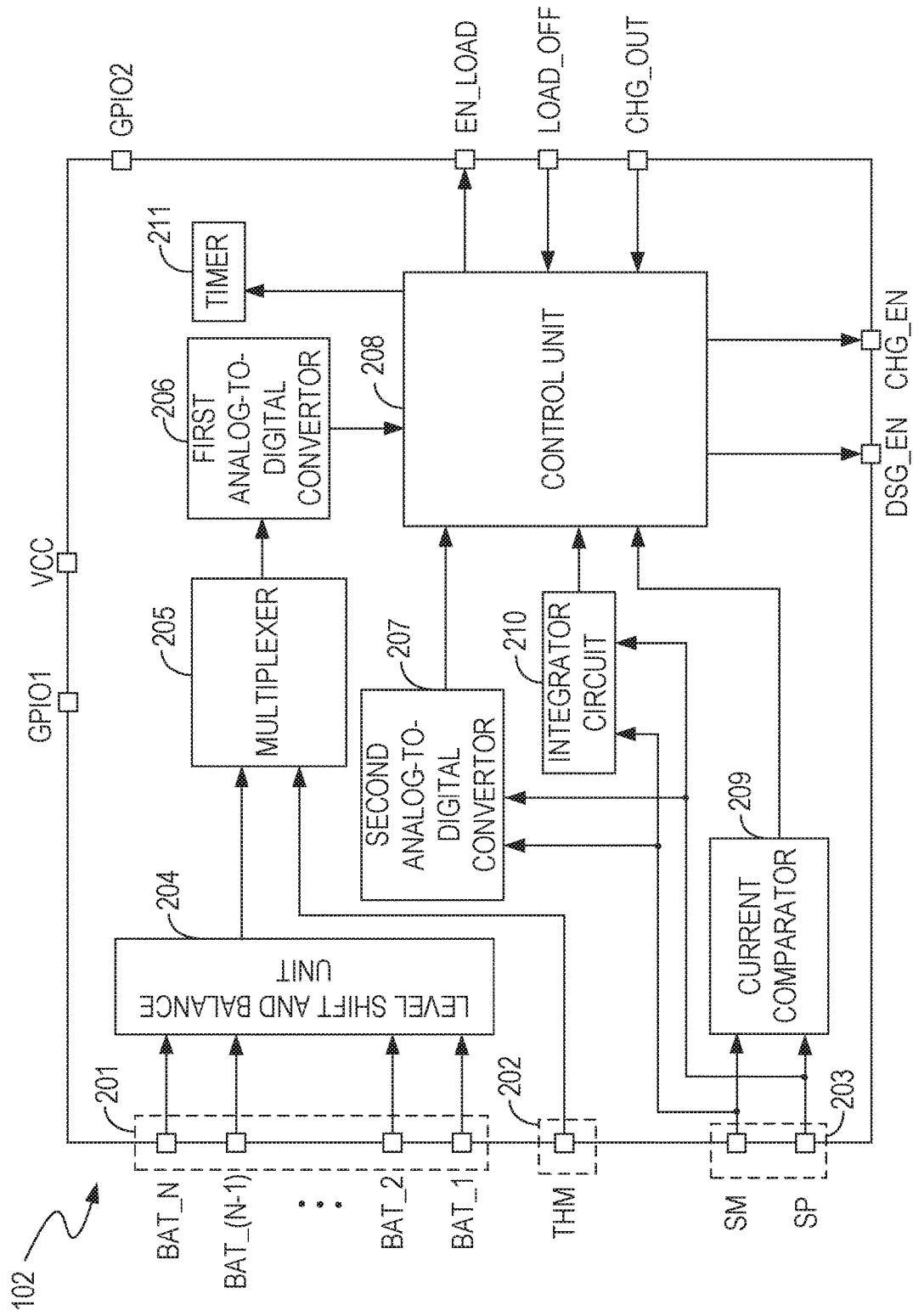
FIG. 2 shows a block diagram illustrating a controller, in accordance with embodiments of the present invention.

FIG. 2 shows a block diagram illustrating a controller 102, in accordance with embodiments of the present invention. FIG. 2 is described in conjunction with FIG. 1. In an embodiment, the acquiring terminal 109 includes a voltage acquiring terminal 201, a temperature acquiring terminal 202, and a current acquiring terminal 203. The controller 102 includes a level shift and balance unit 204, a multiplexer 205, a first analog-to-digital convertor 206, a second analog-to-digital convertor 207, and a control unit 208. The detection terminal 110 includes a terminal EN_LOAD. The receiving terminal 111 includes a terminal LOAD_OFF and a terminal CHG_OUT. The control terminal 112 includes a terminal DSG_EN and a terminal CHG_EN.

The voltage acquiring terminal 201 is coupled to the battery 101 and receives voltages $V_{IN}$ indicating the battery voltage $V_{BAT}$ of each cell in the battery 101. In an embodiment, the voltage acquiring terminal 201 includes a terminal BAT_1, a terminal BAT_2, ..., a terminal BAT_N. The terminal BAT_1 is coupled to the cell CELL_1, the terminal BAT_2 is coupled to the cell CELL_2, ..., the terminal BAT_N is coupled to the cell CELL_N. The terminal BAT_n receives a voltage $V_{IN}$ indicating the battery voltage $V_{BAT}$ of the cell CELL_n, where n=1, 2, ..., N.

The temperature acquiring terminal 202 is coupled to the controller 102. In an embodiment, the temperature acquiring terminal 202 includes a terminal THM that receives a sensing voltage $V_{THM}$ indicating the battery temperature $T_{BAT}$ of the battery pack 100. In another embodiment, the temperature acquiring terminal 202 includes a terminal THM1 that receives a voltage indicating a temperature of the charging switch $Q_{CHG}$ and the discharging switch $Q_{DSG}$.

The current acquiring terminal 203 is coupled to the battery 101, and receives a sensing voltage $V_{SEN}$ indicating the amount of the battery current $I_{BAT}$ of the battery pack 100. In an embodiment, the current acquiring terminal 203 includes a terminal SM and a terminal SP. The current acquisition circuit 104 (e.g., the current sensor $R_{SEN}$) is coupled between the terminal SM and the terminal SP. The terminal SM and the terminal SP each receive a voltage value and convert these two voltage values to the sensing voltage $V_{SEN}$, which indicates the amount of the battery current $I_{BAT}$ of the battery pack 100. The sensing voltage $V_{SEN}$ is the difference between the two voltage values.

The level shift and balance unit 204 is coupled to the voltage acquiring terminal 201. The level shift and balance unit 204 receives the voltages $V_{IN}$ through the voltage acquiring terminal 201 and converts them to the battery voltages $V_{BAT}$. Each voltage $V_{IN}$ is a voltage at the positive electrode of a cell relative to a ground. The battery voltage $V_{BAT}$ is a voltage difference between adjacent positive poles of two cells.

In an embodiment, the level shift and balance unit 204 is coupled to the terminal BAT_1, the terminal BAT_2, ..., the terminal BAT_N. The level shift and balance unit 204 receives the voltages $V_{IN}$ through those terminals and converts them to the battery voltage $V_{BAT}$ of each cell. For example, for the cell CELL_3, the indicating voltage $V_{IN\_3}=V_{CELL\_1}+V_{CELL\_2}+V_{CELL\_3}$; for the cell CELL_2, the voltage $V_{IN\_2}=V_{CELL\_1}+V_{CELL\_2}$; and thus, the battery voltage $V_{BAT\_3}$ of the cell CELL_3, $V_{BAT\_3}=V_{IN\_3}-V_{IN\_2}=V_{CELL\_3}$. In embodiments, the level shift and balance unit 204 receives a balance signal transmitted by the control unit 208 and performs a balance operation to balance the cell voltages in response to the balance signal.

The multiplexer 205 is coupled to (e.g., between) the level shift and balance unit 204 and the temperature acquiring terminal 202. The multiplexer 205 receives the battery voltages $V_{BAT}$ of each cell transmitted by the level shift and balance unit 204, receives the sensing voltage $V_{THM}$ transmitted by the temperature acquiring terminal 202, and selectively transmits the battery voltages and the sensing voltage to the first analog-to-digital convertor 206 in response to a signal from the control unit 208.

The first analog-to-digital convertor 206 converts the battery voltages $V_{BAT}$ and the sensing voltage $V_{THM}$ into digital form. The second analog-to-digital convertor 207 converts the sensing voltage $V_{SEN}$ into digital form. The battery voltage $V_{BAT}$, the battery temperature $T_{THM}$, and the battery current $I_{BAT}$ are thus also expressed in digital form. In the power mode, the first analog-to-digital convertor 206 and the second analog-to-digital convertor 207 receive and convert the values of battery parameters periodically (not continuously). In other modes, the first analog-to-digital convertor 206 and the second analog-to-digital convertor 207 are turned off to save the power consumption of the battery pack 100. In other words, power is not provided to the first and second analog-to-digital convertors 206, 207 in those other modes.

The control unit 208 is coupled to the first analog-to-digital convertor 206 and the second analog-to-digital convertor 207. The control unit 208 receives the values of the battery parameters in digital form and determines whether the values of the battery parameters satisfy the sleep condition. The sleep condition can be specified by design and/or set by a user. In an embodiment, the sleep condition is that the battery current $I_{BAT}$ is not present in the battery pack 100, the values of the battery parameters do not satisfy a failure condition and an abnormal condition, and the battery voltages $V_{BAT}$ do not satisfy a balance condition. When the values of the battery parameters satisfy the sleep condition, the control unit 208 generates the enable signal and transmits that signal to the detection terminal 110, to enable the detection circuit 106 to detect whether the battery pack 100 is connected to the load and/or charger.

Failure conditions, abnormal conditions, and the balance condition are described in more detail below.

The failure conditions are for determining whether a failure event has occurred or is occurring in the battery pack 100. For example, when the battery voltage $V_{BAT}$ of any of the cells is not lower than a high voltage threshold $V_{HIGH}$ (that is, $V_{BAT} \geq V_{HIGH}$), this indicates that a permanent voltage-high failure event is occurring in the battery pack 100. When the battery voltage $V_{BAT}$ of any of the cells is not greater than a low voltage threshold $V_{LOW}$ (that is, $V_{BAT} \leq V_{LOW}$), this indicates that a permanent voltage-low failure event is occurring in the battery pack 100. When the minimum value $V_{LOWEST}$ of all the battery voltages is not lower than a preset voltage $V_{SET}$ (that is, $V_{LOWEST} \geq V_{SET}$), and the voltage difference $\Delta V$ between the minimum and the maximum of all the battery voltages is not lower than the preset voltage difference $\Delta V_{SET}$ (that is, $\Delta V \geq \Delta V_{SET}$), this indicates that a permanent voltage-unbalance failure event is occurring in the battery pack 100. As long as at least one of the above three failure conditions is satisfied, a failure event is identified as occurring in the battery pack 100. The thresholds for the failure conditions can be specified by design and/or set by a user. Once a failure event is identified as occurring, the control unit 208 transmits the aforementioned fuse signal to enable the fuse control circuit 115 to operate (e.g., blow) the fuse, thus turning off the connection between the battery pack 100 and the charger and/or load to protect the battery pack 100.

The abnormal conditions are for determining whether the battery pack 100 is in an abnormal state, such as in an over-voltage, under-voltage, over-current, over-temperature, or under-temperature state. For example, when the battery voltage $V_{BAT}$ of any of the cells is lower than an under-voltage threshold $V_{UV}$, or not lower than an over-voltage threshold $V_{OV}$ (that is $V_{BAT}<V_{UV}$ or $V_{BAT} \geq V_{OV}$), this indicates that the battery pack 100 is in the under-voltage or over-voltage state. If the battery current $I_{BAT}$ is a charging current $I_{CHG}$ and greater than an over-current threshold $I_{OC}$ (that is, $I_{CHG}>I_{OC}$), this indicates that the battery pack 100 is in the charging over-current state. If the battery current $I_{BAT}$ is a discharging current $I_{DSG}$, and the absolute value of the battery current $I_{BAT}$ is greater than an over-current threshold $I_{OC}'$ (that is, $|I_{DSG}|>I_{OC}'$), this indicates that the battery pack 100 is in a discharging over-current state. If the absolute value of the battery current $I_{BAT}$ is greater than a short-circuit current threshold $I_{SC}$ (that is, $|I_{BAT}|>I_{SC}$), this indicates that the battery pack 100 is in the short-circuit state. If the battery temperature $T_{BAT}$ is not lower than an over-temperature threshold $T_{OT}$ or not greater than an under-temperature threshold $T_{UT}$ (that is, $T_{BAT} \geq T_{OT}$ or $T_{BAT} \leq T_{UT}$), or a temperature of either the charging switch $Q_{CHG}$ or the discharging switch $Q_{DSG}$ is not lower than an over-temperature threshold $T_{OT}'$ or not greater than under-temperature threshold $T_{UT}'$ (that is, $T_{FET} \geq T_{OT}'$ or $T_{FET} \leq T_{UT}'$), this indicates that the battery pack 100 is in an under-temperature or over-temperature state. As long as any one of the above abnormal conditions is satisfied, the battery pack 100 is in the abnormal state. The thresholds for the abnormal conditions can be specified by design and/or set by a user.

The balance condition is for determining whether a balance operation should be performed on the battery 101. For example, when the minimum value $V_{LOWEST}$ of all the battery voltages for all the cells is greater than a preset voltage $V_{SET}'$ (that is, $V_{LOWEST}>V_{SET}'$), and the voltage difference $\Delta V$ between the minimum and the maximum of all the battery voltages is greater than the preset voltage difference $\Delta V_{SET}'$ (that is, $\Delta V>\Delta V_{SET}'$), this indicates that the battery pack 100 is in the unbalanced state. As long as the above balance condition is satisfied, the battery pack 100 is in the unbalanced state and a balance operation should be performed on the battery 101. The threshold for the balance condition can be specified by design and/or set by a user.

In an embodiment, the terminal CHG_EN and the terminal DSG_EN are each coupled to the switch control circuit 113. The switch control circuit 113 converts the control signal to a high-voltage or low-voltage signal to turn on or turn off the charging switch $Q_{CHG}$ or the discharging switch $Q_{DSG}$. The control unit 208 transmits the aforementioned control signal through the terminal CHG_EN to the switch control circuit 113, to turn on or turn off the charging switch $Q_{CHG}$. Alternatively, the control unit 208 transmits the control signal through the terminal DSG_EN to the switch control circuit 113, to turn on or turn off the discharging switch $Q_{DSG}$. For example, if a discharging over-temperature event, a discharging over-current event, a short circuit event or an under-voltage event is present in the battery pack 100, then the control unit 208 transmits the control signal through the terminal DSG_EN, to control the on/off state of the discharging switch $Q_{DSG}$. If a charging over-current event, an over-voltage event, or a charging over-temperature event is present in the battery pack 100, then the control unit 208 transmits the control signal through the terminal CHG_EN.

In an embodiment, the controller 102 includes a current comparator 209. The current comparator 209 is coupled between the current acquiring terminal 203 and the control unit 208. The current comparator 209 receives the sensing voltage $V_{SEN}$, which indicates the amount of battery current $I_{BAT}$, through the current acquiring terminal 203, compares the sensing voltage with a first voltage value, and transmits a comparison result to the control unit 208. According to the comparison result, the control unit 208 can determine whether the battery pack 100 is in a short-circuit or over-current state. If so, the control unit 208 can perform a corresponding protection operation (e.g., turn off the charging switch $Q_{CHG}$ and the discharging switch $Q_{DSG}$). The current comparator 209 operates in all operating modes.

In an embodiment, the controller 102 includes an integrator circuit 210. After the battery pack 100 enters the sleep state, the integrator circuit 210 integrates the sensing voltage $V_{SEN}$ acquired by the terminal SM and the terminal SP over a preset time period, and thus acquires a voltage value. When the voltage value is greater than the second voltage value, it determines the presence of the battery current $I_{BAT}$ in the battery pack 100. In response, the control unit 208 is awakened. The integrator circuit 210 operates in all sleep modes.

In an embodiment, the controller 102 includes a timer 211. The timer 211 is coupled to the control unit 208. The timer 211 measures and records time to enable the control unit 208 to perform an operation that is performed depending on how much time has passed. For example, the timer 211 measures and records the time since the battery pack 100 entered the sleep state, and when the measured length of time is greater than that of a preset sleep time period, then the control unit 208 determines whether a trigger event has occurred, where the trigger event can take the battery pack 100 out of the sleep state. Different types of trigger events are described below (see the discussion of FIG. 3).

The controller 102 includes a clock (not shown in the figure). The clock transmits a clock signal at a selectable frequency to enable the controller 102 to operate in a coordinated and orderly manner. In the power mode, the operating frequency of the clock is higher, such as two MHz. In other modes, the operating frequency of the clock is lower, such as 64 KHz. Therefore, in the modes other than the power mode, the power consumption of the battery pack 100 can be reduced and the standby time of the battery 101 can be prolonged by reducing the operating frequency of the clock.

In an embodiment, the terminal EN_LOAD is coupled to the load access detection circuit 107. The controller 102 transmits the enable signal through the terminal EN_LOAD to enable operation of the load access detection circuit 107.

In an embodiment, the terminal LOAD_OFF is coupled to the load access detection circuit 107. The terminal LOAD_OFF receives the detection result transmitted by the load access detection circuit 107 and transmits that detection result to the control unit 208. The terminal CHG_OUT is coupled to the charger access detection circuit 108. The terminal CHG_OUT receives the detection result transmitted by the charger access detection circuit 108 and transmits that detection result to the control unit 208.

The control unit 208 controls the battery pack 100 to enter one of the sleep modes according to the detection results transmitted by the load access detection circuit 107 and the charger access detection circuit 108. Meanwhile, the control unit 208 also generates and transmits the aforementioned control signal to the switch control circuit 113, which turns on or turns off the charging switch $Q_{CHG}$ and/or the discharging switch $Q_{DSG}$ according to the control signal, as previously described herein. In different sleep modes, the on/off state of the charging switch $Q_{CHG}$ and/or the on/off state of the discharging switch $Q_{DSG}$ are different from each other. On the one hand, this can reduce the power consumption of the battery pack 100. On the other hand, the battery pack 100 can enter the power mode at any time. Meanwhile, some components in the controller 102 stop operating to reduce the power consumption of the battery pack 100. The sleep modes include the load sleep mode, the non-load sleep mode, and the charger sleep mode.

In an embodiment, if the detection result is that the battery pack 100 is not connected to the load or to the charger, then the control unit 208 controls the battery pack 100 to enter the non-load sleep mode, generates the control signal, and transmits the control signal to the control terminal 112. The control signal is a second-level (e.g., low level) voltage signal indicating that the charging switch $Q_{CHG}$ and the discharging switch $Q_{DSG}$ can be turned off. The switch control circuit 113 receives the second-level voltage signal from the control terminal 112, and converts that signal to a low voltage signal, to turn off the charging switch $Q_{CHG}$ and the discharging switch $Q_{DSG}$. In the non-load sleep mode, both the charging switch $Q_{CHG}$ and the discharging switch $Q_{DSG}$ are turned off to reduce the power consumption of the battery pack 100. Only the integrator circuit 210, the current comparator 209, and the clock in the controller 102 can continue to operate, and the operating frequency of the clock switches from high to low, to further reduce the power consumption of the battery pack 100 and prolong the standby time of the battery 101. Compared with the other modes, the power consumption of the battery pack 100 in the non-load sleep mode is the lowest.

In an embodiment, if the detection result is that the battery pack 100 is not connected to the load, but is connected to the charger, then the control unit 208 controls the battery pack 100 to enter the charger sleep mode, generates the control signal, and transmits the control signal to the control terminal 112, to turn off the discharging switch $Q_{DSG}$ and turn on the charging switch $Q_{CHG}$. The control signal includes a first-level voltage signal indicating that the charging switch $Q_{CHG}$ can be turned on, and also includes a second-level voltage signal indicating that the discharging switch $Q_{DSG}$ can be turned off. The switch control circuit 113 receives the first-level voltage signal from the control terminal 112, and converts that signal to a high voltage signal, to turn on the charging switch $Q_{CHG}$. The switch control circuit 113 receives the second-level voltage signal and converts it to a low voltage signal, to turn off the discharging switch $Q_{DSG}$. In the charger sleep mode, the charging switch $Q_{CHG}$ is turned on and the battery pack 100 can be charged at any time. Meanwhile, the discharging switch $Q_{DSG}$ is turned off to reduce the power consumption of the battery pack 100. Only the integrator circuit 210, the current comparator 209, and the clock in the controller 102 can continue to operate, and the operating frequency of the clock switches from high to low, to further reduce the power consumption of the battery pack 100 and prolong the standby time of the battery 101.

In an embodiment, if the detection result is that the battery pack 100 is connected to the load, then the control unit 208 controls the battery pack 100 to enter the load sleep mode, generates the control signal, and transmits the control signal to the control terminal 112, to turn on the charging switch $Q_{CHG}$ and the discharging switch $Q_{DSG}$. The control signal includes the first-level voltage signal indicating that the charging switch $Q_{CHG}$ and the discharging switch $Q_{DSG}$ can be turned on. The switch control circuit 113 receives the first-level voltage signal from the control terminal 112, and converts that signal to a high voltage signal, to turn on the charging switch $Q_{CHG}$ and the discharging switch $Q_{DSG}$. In the load sleep mode, only the integrator circuit 210, the current comparator 209, and the clock in the controller 102 can continue to operate, and the operating frequency of the clock switches from high to low, to further reduce the power consumption of the battery pack 100 and prolong the standby time of the battery 101. In addition, the charging switch $Q_{CHG}$ and the discharging switch $Q_{DSG}$ are turned on to enable the battery pack 100 to discharge or to be charged at any time.

In an embodiment, if the values of the battery parameters satisfy a failure condition, then the control unit 208 controls the battery pack 100 to enter the suspend mode, generates the control signal, and transmits the control signal to the control terminal 112, to turn off the charging switch $Q_{CHG}$ and the discharging switch $Q_{DSG}$. The control signal includes the second-level voltage signal indicating that the charging switch $Q_{CHG}$ and the discharging switch $Q_{DSG}$ can be turned off. The switch control circuit 113 receives the second-level voltage signal from the control terminal 112, and converts that signal to the low voltage signal, to turn off the charging switch $Q_{CHG}$ and the discharging switch $Q_{DSG}$. In the suspend mode, both the charging switch $Q_{CHG}$ and the discharging switch $Q_{DSG}$ are turned off to reduce the power consumption of the battery pack 100. Only the integrator circuit 210, the current comparator 209, and the clock in the controller 102 can continue to operate, and the operating frequency of the clock switches from high to low, to further reduce the power consumption of the battery pack 100 and prolong the standby time of the battery 101.

In an embodiment, if the battery voltage $V_{BAT}$ is lower than the shutdown threshold $V_{SHUT}$, then the control unit 208 controls the battery pack 100 to enter a shutdown mode, generates the control signal, and transmits the control signal to the control terminal 112, to turn off the charging switch $Q_{CHG}$ and the discharging switch $Q_{DSG}$. The control signal includes the second-level voltage signal indicating that the charging switch $Q_{CHG}$ and the discharging switch $Q_{DSG}$ can be turned off. The switch control circuit 113 receives the second-level voltage signal from the control terminal 112, and converts that signal to the low voltage signal, to turn off the charging switch $Q_{CHG}$ and the discharging switch $Q_{DSG}$. In the shutdown mode, the battery 101 does not supply electric power to the battery pack 100. That is, the controller 102 and peripheral circuits, except for the charger access detection circuit 108, stop operating.

Figure 3:
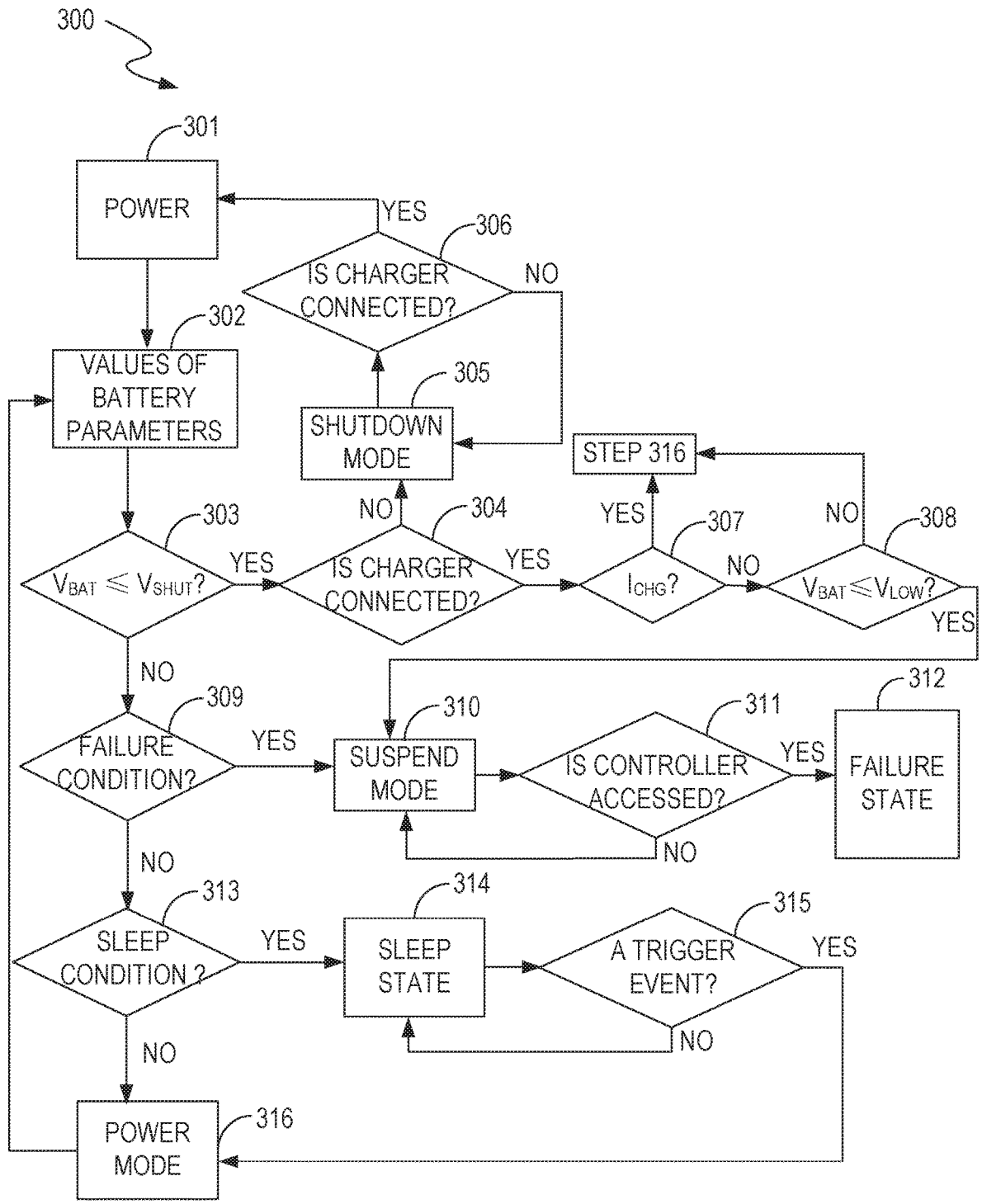
FIG. 3 shows a flowchart of a battery management method, in accordance with embodiments of the present invention.

FIG. 3 shows a flowchart 300 of a battery management method, in accordance with embodiments of the present invention. FIG. 3 is described in conjunction with FIG. 1 and FIG. 2.

In step 301 of FIG. 3, the battery pack 100 is powered after a battery 101 is inserted into the battery pack 100.

In step 302, the controller 102 acquires values of battery parameters for the battery pack 100, including a battery voltage $V_{BAT}$ and a battery current $I_{BAT}$.

In step 303, the controller 102 determines whether the battery voltage $V_{BAT}$ is lower than a shutdown threshold $V_{SHUT}$. If yes, step 303 is followed by step 304. Otherwise, step 303 is followed by step 309. In an embodiment, the shutdown threshold $V_{SHUT}$ is 2850 mV (milli-volts).

In step 304, the charger access detection circuit 108 detects whether the battery pack 100 is connected to a charger. If the battery pack 100 is not connected to the charger, step 304 is followed by step 305. Otherwise, step 304 is followed by step 307. Step 304 can avoid the battery pack 100 being repeatedly shutdown and powered when the charger is accessed or connected after the battery pack 100 enters the shutdown mode.

In step 305, the controller 102 controls the battery pack 100 to enter the shutdown mode, and generates and transmits a control signal to enable the switch control circuit 113 to turn off the charging switch $Q_{CHG}$ and the discharging switch $Q_{DSG}$. In the shutdown mode, the battery 101 does not supply electric power to the battery pack 100. The controller 102 and the peripheral circuits, except for the charger access detection circuit 108, stop operating, to reduce the power consumption of the battery pack 100. In other words, in the shutdown mode, the remaining capacity of the battery 101 does not change, thus prolonging the standby time of the battery 101.

In step 306, in the shutdown mode, after the battery pack 100 is connected to the charger, the battery pack 100 is powered on again, and step 306 is followed by step 301. Otherwise, the battery pack 100 is still in the shutdown mode, and step 306 is followed by step 305.

In step 307, after the battery pack 100 is connected to the charger, if the battery current $I_{BAT}$ is greater than a charging current threshold $I_{C\_SET}$ ($I_{BAT} > I_{C\_SET}$), then the battery current $I_{BAT}$ is a charging current $I_{CHG}$ and the battery pack 100 enters a power mode, and step 307 is followed by step 316. Otherwise, step 307 is followed by step 308.

In step 308, if a battery voltage $V_{BAT}$ in the battery parameters is not greater than a low voltage threshold $V_{LOW}$ ($V_{BAT} \leq V_{LOW}$), step 308 is followed by step 310. Otherwise, step 308 is followed by step 316.

In step 309, the controller 102 determines whether the battery voltage $V_{BAT}$ satisfies a failure condition. The failure condition is for determining whether a failure event has occurred or is occurring in the battery pack 100. If yes, step 309 is followed by step 310. Otherwise, step 309 is followed by step 313.

In step 310, the controller 102 controls the battery pack 100 to enter the suspend mode, and generates and transmits a control signal to enable the switch control circuit 113 to turn off a charging switch $Q_{CHG}$ and a discharging switch $Q_{DSG}$. In the suspend mode, both the charging switch $Q_{CHG}$ and the discharging switch $Q_{DSG}$ are turned off to reduce the power consumption of the battery pack 100. Only an integrator circuit 210, a current comparator 209, and a clock can continue to operate, and the operating frequency of the clock is reduced to a lower frequency, to further reduce the power consumption and prolong the standby time of the battery 101.

In step 311, the controller 102 determines whether an external device (e.g., a computer) accesses data stored by the controller 102. The data include, but are not limited to, data indicating an abnormal condition or failure condition. If yes, step 311 is followed by step 312. Otherwise, the battery pack 100 is still in the suspend mode, and step 311 is followed by step 310.

In step 312, if the external device detects that the battery pack 100 is in the suspend mode (that is, there is a failure event), then it can issue an alert of some sort, to notify staff to perform an operation to address the failure event.

In step 313, the controller 102 determines whether the values of the battery parameters satisfy a sleep condition. The sleep condition is for determining whether the battery pack 100 is to enter a sleep state. If yes, step 313 is followed by step 314. Otherwise, step 313 is followed by step 316. Steps 401, 402, 404, 406, and 407 in FIG. 4 describe the process (conditions) that determine whether the battery parameters satisfy the sleep condition.

In step 314 of FIG. 3, the controller 102 controls the battery pack 100 to enter the sleep state. The sleep state includes multiple sleep modes. The sleep modes include a load sleep mode, a non-load sleep mode, and a charger sleep mode. The controller 102 controls the battery pack 100 to enter one of the sleep modes, according to whether the battery pack 100 is connected to the charger and/or load. Additional details are provided in the description of steps 410, 413, and 414 of FIG. 4. Depending on the sleep mode, the controller 102 can control the charging switch $Q_{CHG}$ and/or the discharging switch $Q_{DSG}$ to turn on and/or turn off. On one hand, the power consumption of the battery pack 100 is reduced. On the other hand, the battery pack 100 can enter the power mode at any time. Also, as described above, certain components in the controller 102 stop operating to reduce the power consumed by the battery pack 100.

In step 315 of FIG. 3, in the sleep state, if a trigger event does not occur in the battery pack 100, then step 315 is followed by step 314. That is, if a trigger event does not occur, then the battery pack 100 remains in the sleep state. Otherwise, step 315 is followed by step 316. Different trigger events are used to enable the battery pack 100 to exit the different sleep modes.

For example, if the battery pack 100 is in the non-load sleep mode, then the trigger events include but are not limited to: the load access detection circuit 107 detects that the battery pack 100 is connected to the load; the charger access detection circuit 108 detects that the battery pack 100 is connected to the charger; the length of time the battery pack 100 is in the non-load sleep mode is longer than that of a sleep time period, where time is measured and recorded by the timer 211; and the controller 102 is accessed by an external device. The trigger events can be specified by design and/or set by a user.

For example, if the battery pack 100 is in the load sleep mode, then the trigger events include but are not limited to: the sensing voltage $V_{SEN}$ indicates that the battery current $I_{BAT}$ is greater than a first voltage value, as determined by the current comparator 209; a voltage value exceeds a second voltage value, where the voltage value is acquired by integrating the sensing voltage $V_{SEN}$ indicating the battery current $I_{BAT}$ over a preset time period with the integrator circuit 210; the length of a time the battery pack 100 is in the load sleep mode is greater than that of a sleep time period, where time is measured and recorded by the timer 211; and the controller 102 is accessed by an external device. The trigger events can be specified by design and/or set by a user.

For example, if the battery pack 100 is in the charger sleep mode, the trigger events include but are not limited to: the sensing voltage $V_{SEN}$ indicates that the battery current $I_{BAT}$ is greater than a first voltage value, as determined by the current comparator 209; the integrator circuit 210 integrates the sensing voltage $V_{SEN}$ over the preset time period to acquire a voltage value, and that voltage value exceeds a second voltage value; the length of a time the battery pack 100 is in the charger sleep mode is greater than that of a sleep time period, where time is measured and recorded by the timer 211; and the controller 102 is accessed by an external device. The trigger events can be specified by design and/or set by a user.

In step 316, the controller 102 controls the battery pack 100 to enter the power mode. In the power mode, the controller 102 and the peripheral circuits are operational. On one hand, the battery pack 100 can discharge or be charged. On the other hand, the controller 102 can acquire or access the values of the battery parameters of the battery pack 100; that is, step 316 is followed by step 302.

Figure 4:
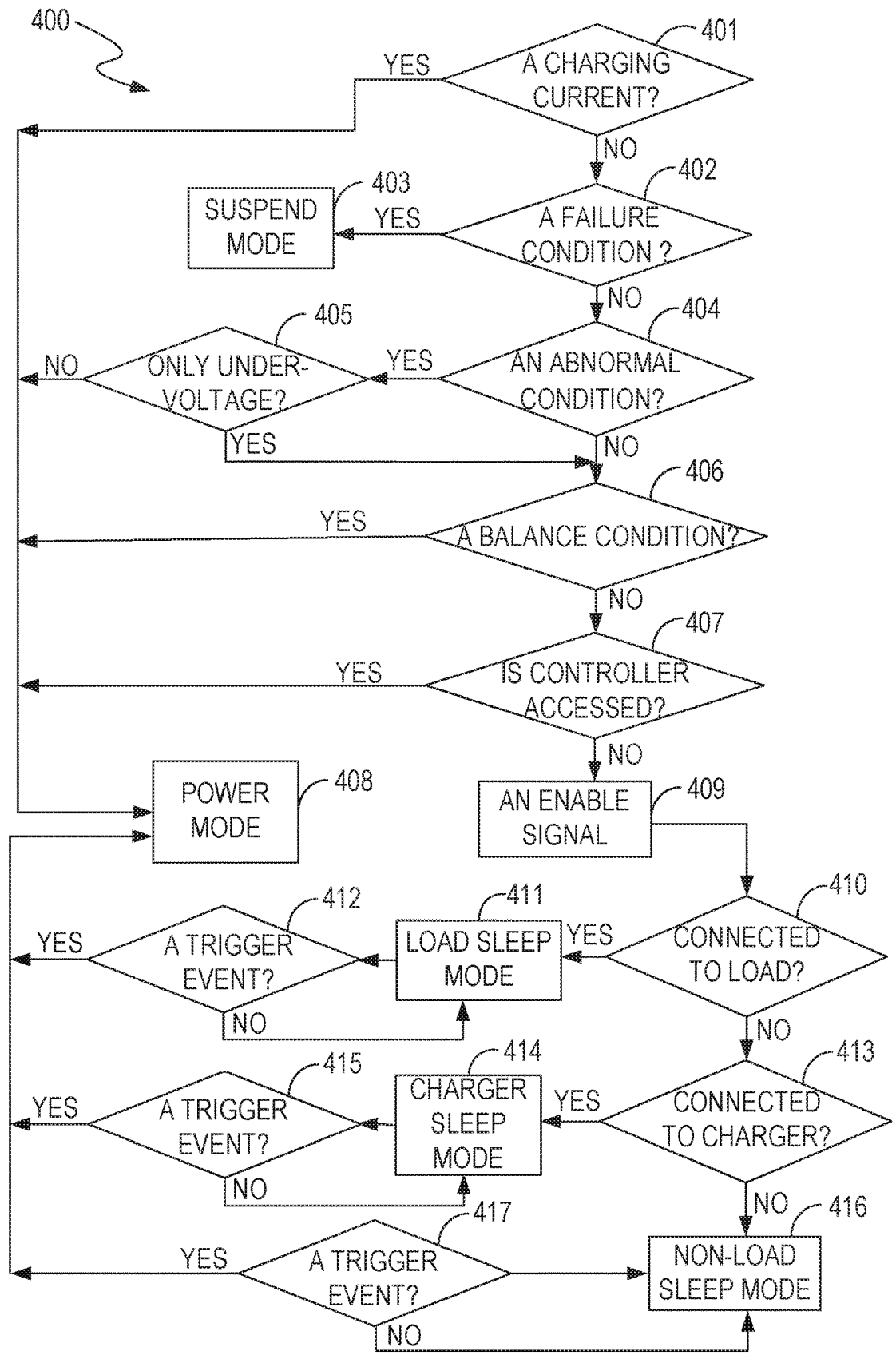
FIG. 4 shows a flowchart of a battery management method, in accordance with embodiments of the present invention.

FIG. 4 shows a flowchart 400 of a battery management method, in accordance with embodiments of the present invention. FIG. 4 is described in conjunction with FIG. 1 and FIG. 3.

In step 401, a controller 102 determines whether there is a charging current $I_{CHG}$ and a discharging current $I_{DSG}$ in the battery pack 100 according to the battery current $I_{BAT}$, where the charging current $I_{CHG}$ is between the battery pack 100 and a charger, and the discharging current $I_{DSG}$ is between the battery pack 100 and a load. More specifically, the battery current $I_{BAT}$ can be either the charging current $I_{CHG}$ or the discharging current $I_{DSG}$. If the battery current $I_{BAT}$ is a positive value and is not lower than a charging current threshold $I_{C\_SET}$ ($I_{CHG} \geq I_{C\_SET}$), then the battery current $I_{BAT}$ is the charging current $I_{CHG}$. If the battery current $I_{BAT}$ is a negative value and the absolute value of the battery current $I_{BAT}$ is not lower than that of a discharging current threshold $I_{D\_SET}$ ($|I_{DSG}| \geq |I_{D\_SET}|$), then the battery current $I_{BAT}$ is the discharging current $I_{DSG}$. When $I_{CHG} \geq I_{C\_SET}$ or $|I_{DSG}| \geq |I_{D\_SET}|$, step 401 is followed by step 408. Otherwise, step 401 is followed by step 402. In an embodiment, $I_{C\_SET}$=100 mA, and $I_{D\_SET}$=−100 mA.

In step 402, the controller 102 determines whether the battery voltage $V_{BAT}$ satisfies a failure condition according to the battery voltage $V_{BAT}$. In an embodiment, the failure condition includes but is not limited to: the battery voltage $V_{BAT}$ of any of the cells is not greater than a low voltage threshold $V_{LOW}$ ($V_{BAT} \leq V_{LOW}$), or not lower than a high voltage threshold $V_{HIGH}$ ($V_{BAT} \geq V_{HIGH}$); or the minimum value $V_{LOWEST}$ of all the battery voltages is not lower than a first voltage value $V_{SET}$ ($V_{LOWEST} \geq V_{SET}$), and a voltage difference $\Delta V_{SET}$ ($\Delta V_{SET}$ is the difference between the maximum and the minimum of the battery voltages of all the cells) is not lower than the preset voltage difference $\Delta V$ ($\Delta V \geq \Delta V_{SET}$). If any of the above failure conditions is satisfied, then step 402 is followed by step 403. Otherwise, step 402 is followed by step 404. In an embodiment, $V_{HIGH}$=4500 mV, $V_{LOW}$=1500 mV, $V_{SET}$=3500 mV, and $\Delta V_{SET}$=500 mV.

In step 403, the controller 102 controls the battery pack 100 to enter a suspend mode, and transmits a control signal to turn off a charging switch $Q_{CHG}$ and a discharging switch $Q_{DSG}$.

In step 404, the controller 102 determines whether the values of the battery parameters satisfy an abnormal condition. In an embodiment, the abnormal condition includes but is not limited to: the battery voltage $V_{BAT}$ of any of the cells is lower than an under-voltage threshold $V_{UV}$ ($V_{BAT}<V_{UV}$), or not lower than an over-voltage threshold $V_{OV}$ ($V_{BAT}\geq V_{OV}$); or the absolute value of the battery current $I_{BAT}$ is higher than an over-current threshold $I_{OC}$ ($|I_{BAT}|>I_{OC}$) or short-circuit threshold $I_{SC}$ ($|I_{BAT}|>I_{SC}$); or the battery temperature $T_{BAT}$ of the battery pack 100 is not lower than an over-temperature threshold $T_{OT}$ ($T_{BAT}\geq T_{OT}$) or not greater than an under-temperature threshold $T_{UT}$ ($T_{BAT}\leq T_{UT}$). If any of the above abnormal conditions is satisfied, then step 404 is followed by step 405. Otherwise, step 404 is followed by step 406.

In step 405, the controller 102 determines whether the abnormal condition includes only an under-voltage state. If yes, then step 405 is followed by step 406. Otherwise, step 405 is followed by step 408.

In step 406, the controller 102 determines whether the values of the battery parameters satisfy a balance condition. In an embodiment, the balance condition is that the battery voltage $V_{BAT}$ of any of the cells is greater than a balance voltage threshold $V_{UB}$ ($V_{BAT}>V_{UB}$), and a voltage difference $\Delta V_{BAT}$ ($\Delta V_{BAT}$ is a difference value between the maximum and the minimum of the battery voltages of all the cells) is greater than a preset value $\Delta V'$ ($\Delta V_{BAT}>\Delta V'$). If the above balance condition is not satisfied, then step 406 is followed by step 407. Otherwise, step 406 is followed by step 408. In an embodiment, $V_{UB}=3500$ mV, and $\Delta V'=50$ mV.

In step 407, the controller 102 determines whether an external device (e.g., a computer) accesses data stored by the controller 102. If yes, then step 407 is followed by step 408. Otherwise, step 407 is followed by step 409.

In step 408, if the battery pack 100 is not already in the power mode when the data is accessed by the external device, then it enters the power mode; if it is already in the power mode, it remains in the power mode. The external device accesses the controller 102 to acquire the values of the battery parameters. For example, when the external device accesses the controller 102, components (e.g., the level shift and balance unit 204, the multiplexer 205, and so on) in the controller 102 start to operate, or continue to operate, to acquire the values of the battery parameters. Accordingly, the battery pack 100 either enters the power mode or remains in the power mode. In the power mode, the battery pack 100 can discharge or be charged. Meanwhile, the controller 102 and the peripheral circuits continue to operate. The controller 102 acquires or accesses the values of the battery parameters and determines whether the battery pack 100 should be switched from the power mode to another mode according to the values of the battery parameters.

In step 409, when the values of the battery parameters satisfy a sleep condition, the controller 102 transmits an enable signal to enable a load access detection circuit 107 to detect whether the battery pack 100 is connected to the load.

In step 410, the load access detection circuit 107 detects whether the battery pack 100 is connected to the load, acquires a detection result, and transmits it to the controller 102. When the detection result is a low-level signal, the controller 102 determines that the battery pack 100 is connected to the load, and step 410 is followed by step 411. Otherwise, step 410 is followed by step 413.

In step 411, the controller 102 controls the battery pack 100 to enter a load sleep mode, and generates and transmits a control signal to enable a switch control circuit 113 to turn on the discharging switch $Q_{DSG}$ and the charging switch $Q_{CHG}$. In the load sleep mode, only an integrator circuit 210, a current comparator 209, and a clock can continue to operate, and the clock switches from a high (e.g., 2 MHz) to a low (e.g., 64 KHz) frequency, to reduce the power consumption of the battery pack 100 and prolong the standby time of the battery 101. In addition, the charging switch $Q_{CHG}$ and the discharging switch $Q_{DSG}$ are turned on to enable the battery pack 100 to discharge or be charged at any time.

In step 412, if a trigger event does not occur in the battery pack 100 after the battery pack 100 enters the load sleep mode, then step 412 is followed by step 411. Otherwise, step 412 is followed by step 408. In the load sleep mode, the trigger events include but are not limited to: the sensing voltage $V_{SEN}$ indicates that the battery current $I_{BAT}$ is greater than a first voltage value, as determined by the current comparator 209; a voltage value exceeds a second voltage value, where the voltage value is acquired by integrating the sensing voltage $V_{SEN}$ over a preset time period with the integrator circuit 210; the length of a time the battery pack 100 is in the load sleep mode is greater than that of a sleep time period, where time is measured and recorded by the timer 211; and the controller 102 is accessed by an external device. The trigger events can be specified by design and/or set by a user.

In step 413, the charger access detection circuit 108 detects whether the battery pack 100 is connected to the charger, acquires a detection result, and transmits that result to the controller 102. When the detection result is the low-level signal, the controller 102 determines that the battery pack 100 is connected to the charger, and step 413 is followed by step 414. Otherwise, step 413 is followed by step 416.

In step 414, the controller 102 controls the battery pack 100 to enter a charger sleep mode, and generates and transmits a control signal to enable the switch control circuit 113 to turn on the charging switch $Q_{CHG}$ and turn off the discharging switch $Q_{DSG}$. In the charger sleep mode, the charging switch $Q_{CHG}$ is turned on to enable the battery pack 100 to be charged at any time. Meanwhile, the discharging switch $Q_{DSG}$ is turned off to reduce the power consumption of the battery pack 100. In the charger sleep mode, only the integrator circuit 210, the current comparator 209, and the clock continue to operate, and the clock switches from a high (e.g., 2 MHz) to a low (e.g., 64 KHz) frequency, to further reduce power consumption and prolong the standby time of the battery pack 100.

In step 415, if a trigger event does not occur in the battery pack 100 after the battery pack 100 enters the charger sleep mode, then step 415 is followed by step 414. Otherwise, step 415 is followed by step 408. In the charger sleep mode, the trigger events includes but are not limited to: the sensing voltage $V_{SEN}$ indicates that the battery current $I_{BAT}$ is greater than the first voltage value, as determined by the current comparator 209; a voltage value exceeds a second voltage value, where the voltage value is acquired by integrating the sensing voltage $V_{SEN}$ over a preset time period with the integrator circuit 210; the length of time that the battery pack 100 is in the charger sleep mode is greater than that of the sleep time period, where time is measured and recorded by the timer 211; and the controller 102 is accessed. The trigger events can be specified by design and/or set by a user.

In step 416, the battery pack 100 is not connected to the load or to the charger. The controller 102 controls the battery pack 100 to enter a non-load sleep mode, and generates and transmits a control signal to enable the switch control circuit 113 to turn off the charging switch $Q_{CHG}$ and the discharging switch $Q_{DSG}$. In the non-load sleep mode, both the charging switch $Q_{CHG}$ and the discharging switch $Q_{DSG}$ are turned off to reduce the power consumption of the battery pack 100. In the non-load sleep mode, only the integrator circuit 210, the current comparator 209, and the clock continue to operate, and the clock switches from a high (e.g., 2 MHz) to a low (e.g., 64 KHz) frequency, to further reduce the power consumption of the battery pack 100 and prolong the standby time of the battery 101. In the non-load sleep mode, the power consumption of the battery pack 100 is minimized.

In step 417, if a trigger event does not occur in the battery pack 100, then step 417 is followed by step 416. Otherwise, step 417 is followed by step 408. In the non-load sleep mode, the trigger events include but are not limited to: the battery pack 100 is connected to the load, which is detected by the load access detection circuit 107; the battery pack 100 is connected to the charger, which is detected by the charger access detection circuit 108; the length of time that the battery pack 100 is in the non-load sleep mode is greater than that of the sleep time period, where time is measured and recorded by the timer 211; and the controller 102 is accessed. The trigger events can be specified by design and/or set by a user.

Figure 5:
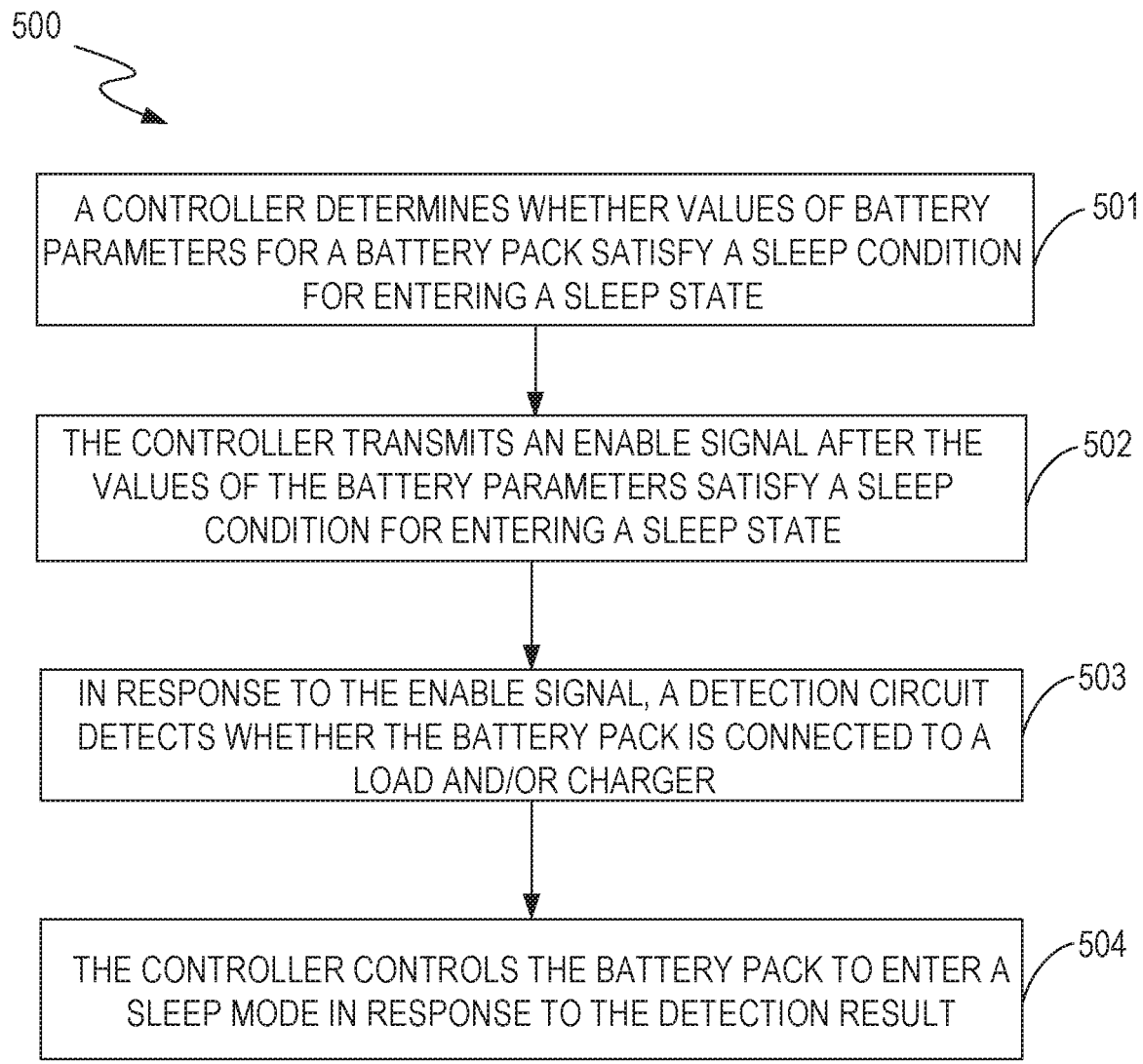
FIG. 5 shows a flowchart of a battery management method, in accordance with embodiments of the present invention.

FIG. 5 shows a flowchart 500 of a battery management method, in accordance with embodiments of the present invention. FIG. 5 is described in conjunction with FIG. 1.

In step 501, a controller 102 determines whether values of battery parameters for a battery pack satisfy a sleep condition for entering a sleep state. More specifically, a controller 102 acquires values of battery parameters of a battery pack 100 after a battery 101 is inserted into the battery pack 100. The controller 102 determines whether the values of the battery parameters satisfy a sleep condition for entering a sleep state. The sleep state includes a load sleep mode, a non-load sleep mode and a charger sleep mode.

In step 502, the controller 102 transmits an enable signal after the values of the battery parameters satisfy a sleep condition for entering a sleep state. The sleep state includes multiple sleep modes. The sleep modes include a load sleep mode, a non-load sleep mode, and a charger sleep mode. The sleep conditions are for determining whether the battery pack 100 is to enter the sleep state. In an embodiment, the sleep condition is that a battery current $I_{BAT}$ is not present in the battery pack 100, the values of the battery parameters do not satisfy a failure condition and an abnormal condition, and a battery voltage $V_{BAT}$ does not satisfy a balance condition.

In step 503, in response to the enable signal, a detection circuit 106 detects whether the battery pack 100 is connected to a load and/or charger, acquires a detection result, and transmits that result to the controller 102. In an embodiment, the detection circuit 106 includes a load access detection circuit 107 and a charger access detection circuit 108. The load access detection circuit 107 detects whether the battery pack 100 is connected to the load, acquires the detection result (e.g., a high-level signal or a low level signal), and transmits the detection result to the controller 102. The charger access detection circuit 108 detects whether the battery pack 100 is connected to the charger, acquires the detection result (e.g., a high-level signal or a low-level signal), and transmits the detection result to the controller 102.

In step 504, the controller 102 controls the battery pack 100 to enter a sleep mode in response to the detection result. More specifically, if the detection result is that the battery pack 100 is not connected to the load or to the charger, then the controller 102 controls the battery pack 100 to enter the non-load sleep mode, and transmits the control signal to turn off the charging switch $Q_{CHG}$ and the discharging switch $Q_{DSG}$. If the detection result is that the battery pack 100 is not connected to the load, but is connected to the charger, then the controller 102 controls the battery pack 100 to enter the charger sleep mode and transmits the control signal to turn on the charging switch $Q_{CHG}$ and turn off the discharging switch $Q_{DSG}$. If the detection result is that the battery pack 100 is connected to the load, then the controller 102 controls the battery pack 100 to enter the load sleep mode, and transmits the control signal to turn on the charging switch $Q_{CHG}$ and the discharging switch $Q_{DSG}$. Thus, the controller 102 can control the battery pack 100 to enter different sleep modes according to the detection result. This not only reduces power consumption, but also allows normal operation of the battery pack 100.

While the foregoing description and drawings represent embodiments of the present invention, it will be understood that various additions, modifications, and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller, for managing a battery pack, said controller comprising:
   a detection terminal, coupled to a detection circuit, operable for transmitting an enable signal when values of battery parameters for said battery pack satisfy a sleep condition, wherein said enable signal enables said detection circuit to detect whether said battery pack is connected to a load and whether said battery pack is connected to a charger; wherein said sleep condition is for determining whether said battery pack enters a sleep state, and wherein said sleep state comprises a plurality of sleep modes;
   a receiving terminal, coupled to said detection circuit, operable for receiving a detection result transmitted by said detection circuit, wherein said detection result indicates whether said battery pack is connected to at least one of said load and charger, and wherein said controller is operable for controlling said battery pack to enter a sleep mode of said sleep modes based on said detection result; and
   a control terminal, operable for transmitting a control signal to control an on/off state of a charging switch and an on/off state of a discharging switch, wherein said control signal is generated by said controller based on said detection result.

2. The controller of claim 1, wherein said controller controls said battery pack to enter a power mode from said sleep mode when a trigger event occurs.

3. The controller of claim 2, wherein said trigger event enables said battery pack to switch from said sleep mode to said power mode.

4. The controller of claim 2, wherein:
said controller comprises a timer, an integrator circuit, and a current comparator;
said sleep modes comprise a load sleep mode; and
when said battery pack is in said load sleep mode, said trigger events comprise an event selected from the group consisting of: a length of a time period since said battery pack enters said load sleep mode is longer than that of a sleep time period, wherein said time period is measured and recorded by said timer; a sensing voltage indicating a battery current in said battery parameters is greater than a first voltage value, as determined by said current comparator; a voltage value exceeds a second voltage value, wherein said voltage value is acquired by integrating said sensing voltage over an integration time period with said integrator circuit; and said controller is accessed.

5. The controller of claim 2, wherein:
said controller comprises a timer, an integrator circuit, and a current comparator;
said sleep modes comprise a charger sleep mode; and
when said battery pack is in said charger sleep mode, said trigger events comprise an event selected from the group consisting of: a length of a time period since said battery pack enters said load sleep mode is longer than that of a sleep time period, wherein said time period is measured and recorded by said timer; a sensing voltage indicating a battery current of said battery parameters is greater than a first voltage value, as determined by said current comparator; a voltage value exceeds a second voltage value, wherein said voltage value is acquired by integrating said sensing voltage over an integration time period with said integrator circuit; and said controller is accessed.

6. The controller of claim 2, wherein:
said controller comprises a timer;
said sleep modes comprise a non-load sleep mode;
when said battery pack is in said non-load sleep mode, said trigger events comprise an event selected from the group consisting of: the length of a time period since said battery pack enters said non-load sleep mode is longer than that of a sleep time period, wherein said time period is measured and recorded by said timer; said battery pack is connected to said load, which is detected by said detection circuit; said battery pack is connected to said charger, which is detected by said detection circuit; and said controller is accessed.

7. The controller of claim 1, wherein:
said sleep modes comprise a non-load sleep mode;
said controller comprises a control unit; and
if said detection result indicates that said battery pack is not connected to said load and is not connected to said charger, then said control unit controls said battery pack to enter said non-load sleep mode.

8. The controller of claim 7, wherein said control unit is operable for generating said control signal based on said detection result, to turn off said charging switch and said discharging switch.

9. The controller of claim 1, wherein said sleep modes comprise a charger sleep mode; wherein said controller comprises a control unit; and wherein if said detection result is that said battery pack is not connected to said load but is connected to said charger, then said control unit controls said battery pack to enter said charger sleep mode.

10. The controller of claim 9, wherein said control unit is operable for generating said control signal based on said detection result, to turn on said charging switch and to turn off said discharging switch.

11. The controller of claim 1, wherein said sleep modes comprise a load sleep mode; wherein said controller comprises a control unit; and wherein if said detection result is that said battery pack is connected to said load, then said control unit controls said battery pack to enter said load sleep mode.

12. The controller of claim 11, wherein said control unit is operable for generating said control signal based on said detection result, to turn on said charging switch and said discharging switch.

13. The controller of claim 1, wherein said controller comprises a control unit; wherein if said values of said battery parameters satisfy a failure condition, then said control unit controls said battery pack to enter a suspend mode, and generates said control signal to turn off said charging switch and said discharging switch; wherein said failure condition is operable for determining whether a failure event is present in said battery pack.

14. The controller of claim 1, wherein said controller comprises a control unit; wherein if a battery voltage of said battery parameters is lower than a shutdown threshold, then said control unit controls said battery pack to enter a shutdown mode, and generates said control signal to turn off said charging switch and said discharging switch.

15. A battery management method for managing a battery pack, wherein said battery pack comprises a controller and a detection circuit; wherein said battery management method comprises:
determining, using a controller, whether values of battery parameters for said battery pack satisfy a sleep condition for entering a sleep state, wherein said sleep state comprises a plurality of sleep modes;
transmitting, using said controller, an enable signal to said detection circuit when said values of said battery parameters satisfy said sleep condition;
detecting, using said detection circuit and in response to said enable signal, whether said battery pack is connected to a load and whether said battery pack is connected to a charger, and acquiring a detection result, wherein said detection result indicates whether said battery pack is connected to at least one of said load and charger; and
controlling, using said controller, said battery pack to enter a sleep mode of said sleep modes based on said detection result.

16. The battery management method of claim 15, wherein said controlling comprises, if said detection result is that said battery pack is not connected to said load and not connected to said charger, then:
controlling, using said controller, said battery pack to enter a non-load sleep mode of said sleep modes; and
generating a control signal to turn off a charging switch and a discharging switch.

17. The battery management method of claim 15, wherein said controlling comprises, if said detection result is that said battery pack is not connected to said load but is connected to said charger, then:
controlling, using said controller, said battery pack to enter a charger sleep mode of said sleep modes; and
generating a control signal to turn on a charging switch and to turn off a discharging switch.

18. The battery management method of claim 15, wherein said controlling comprises, if said detection result is that said battery pack is connected to said load, then:
- controlling, using said controller, said battery pack to enter a load sleep mode of said sleep modes; and
- generating a control signal to turn on a charging switch and a discharging switch.

19. The battery management method of claim 15, further comprising, if a battery voltage of said battery parameters is lower than a shutdown threshold, then:
- controlling, using said controller, said battery pack to enter a shutdown mode; and
- generating a control signal to turn off a charging switch and a discharging switch.

20. The system of claim 15, further comprising, if said values of said battery parameters satisfy a failure condition, then:
- controlling, using said controller, said battery pack to enter a suspend mode; and
- generating said control signal to turn off a charging switch and a discharging switch; wherein said failure condition is for determining whether a failure event is present in said battery pack.

\* \* \* \* \*